United States Patent [19]

Shields

[11] 3,983,991
[45] Oct. 5, 1976

[54] APPARATUS AND METHOD FOR CONVEYING, POURING AND COOLING FOUNDRY MOLDS

[75] Inventor: Robert G. Shields, Jefferson, Ohio

[73] Assignee: The Osborn Manufacturing Corporation, Cleveland, Ohio

[22] Filed: Dec. 10, 1973

[21] Appl. No.: 423,099

[52] U.S. Cl. .................. 198/31 AB; 198/107; 164/326
[51] Int. Cl.² ............................................. B65G 47/26
[58] Field of Search .................. 164/18, 168, 326, 327; 198/19, 24, 25, 31 AB, 75, 103, 107, 198/209, 218; 214/16.1 A, 16.4 C

[56] References Cited
UNITED STATES PATENTS

| 3,029,482 | 4/1962 | Burnett | 164/18 |
| 3,150,758 | 9/1964 | Johnson | 198/25 |
| 3,703,921 | 11/1972 | Hunter | 198/19 X |
| 3,737,057 | 6/1973 | Neumann et al. | 214/16.1 A |
| 3,545,600 | 12/1970 | Rudlaff | 198/221 |
| 2,775,269 | 12/1956 | Breeback | 198/25 X |
| 1,782,671 | 11/1930 | Allred, Jr. | 214/16.1 A |
| 2,297,898 | 10/1942 | Kohler | 198/25 X |
| 3,497,087 | 2/1970 | Vita | 214/16.1 A |

Primary Examiner—L. J. Paperner
Assistant Examiner—James M. Slattery
Attorney, Agent, or Firm—Donnelly, Maky, Renner and Otto

[57] ABSTRACT

Foundry molds are positioned in concentric rows on a rotatable circular conveyor, and are transferred between rows and discharged from the outer row by a linear conveyor extending diametrically of the rotatable circular conveyor. The rotatable conveyor is indexed for aligning successive molds with diametrically opposed loading and discharge stations. The molds are transferred between rows and are discharged from the outer row by a linear transfer conveyor that extends diametrically of the rotatable conveyor between the loading and discharge stations.

19 Claims, 13 Drawing Figures

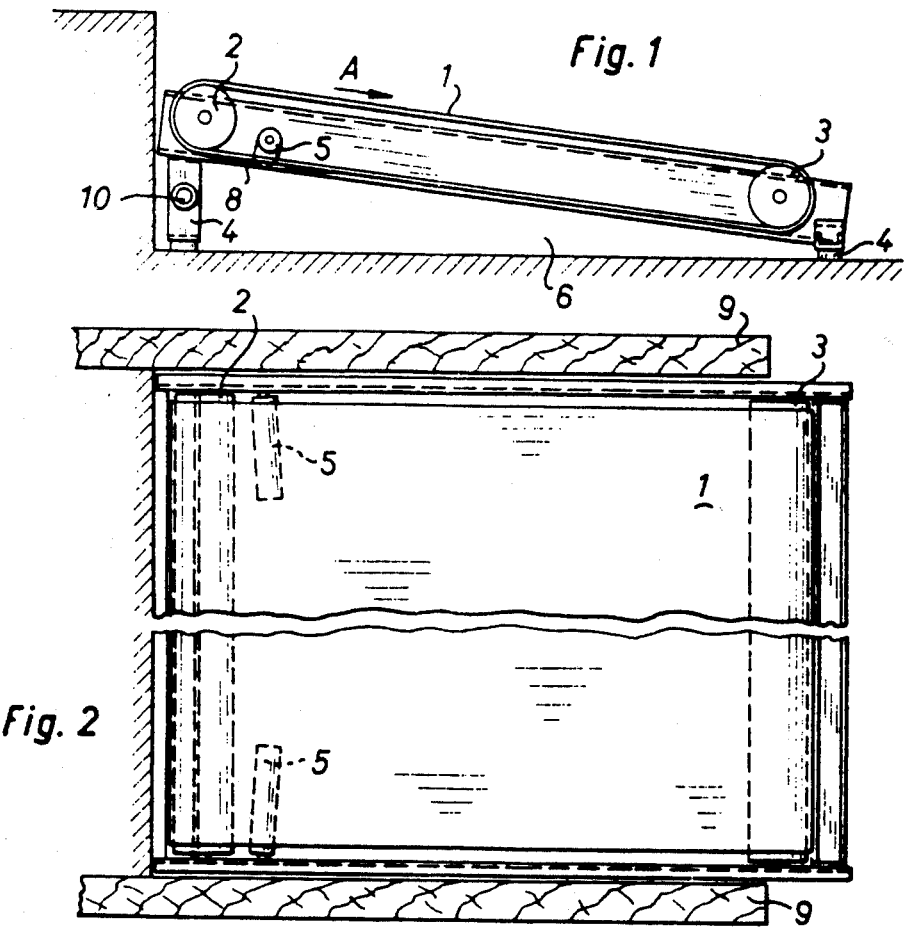
Fig. 1
Fig. 2
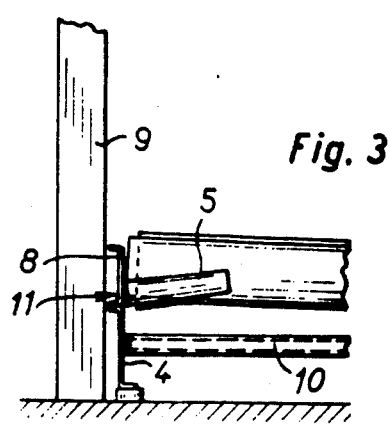
Fig. 3

APPARATUS AND METHOD FOR CONVEYING, POURING AND COOLING FOUNDRY MOLDS

BACKGROUND OF THE INVENTION

Modern equipment for producing castings includes automatic machines for making sand molds at a very high rate. Pouring the molds at a rate at least as great as the molds are being made by the automatic machine requires an extremely large area for cooling the molds subsequent to pouring. Attempts to minimize the space necessary for cooling the molds when they are poured at a very rapid rate include the use of a rotatable conveyor for the molds. In previous arrangements of this type, cooled molds are discharged through a center opening in the rotatable conveyor and molds are also transferred between concentric rows on the conveyor by pushing the molds against one another. Pushing the molds physically against one another often damages the molds and castings, and discharging the molds through a center opening in the conveyor makes it difficult, if not impossible, to move the cooling castings to another work area.

SUMMARY OF THE INVENTION

In accordance with the present invention, a rotatable circular conveyor has concentric rows of supports for foundry molds positioned thereon, which support such molds in a physically separated condition. The rotatable conveyor is indexed for aligning successive molds with diametrically opposed loading and discharge stations. The molds are transferred between rows and are discharged from the outer row by a transfer conveyor extending diametrically of the rotatable conveyor between the loading and discharge stations.

In accordance with one arrangement, a pair of the rotatable conveyors are positioned tangent one another. Molds are transferred from one rotatable conveyor to the other. The conveyors may be identical to each other thus doubling the casting retention capacity of the system.

In accordance with another arrangement, the rotatable conveyor has upper and lower levels, and the molds are transferred between levels and still discharged from an outer row.

In the preferred arrangement, the molds are transferred and discharged by a reciprocating conveyor which raises the molds from the rotatable conveyor during transferring movement thereof. The molds are always positioned in spaced-apart relationship and do not contact one another during movement. This minimizes damage to the molds and castings.

It is a principal object of the present invention to provide an improved apparatus and method for conveying foundry molds for pouring and cooling.

Another object of the invention is to provide an apparatus and method for transferring molds without damaging the molds or castings.

A further object of the invention is to provide an apparatus and method for conveying foundry molds in a compact area and in an efficient manner.

An additional object of the invention is to provide an apparatus and method for conveying foundry molds by transferring molds from one concentric row to another diametrically of a rotatable conveyor and discharging molds from the outer row.

Other objects and advantages of the present invention will become apparent as the description proceeds when taken in connection with the accompanying drawings.

BRIEF DESCRIPTION OF THE DRAWINGS

FIG. 2 is a plan view of another foundry mold conveying arrangement;

FIG. 3 is a plan view of another foundry mold conveying arrangement;

FIG. 5 is a top plan view of a rotatable conveyor constructed in accordance with the present invention;

FIG. 6 is a cross-sectional elevational view looking generally in the direction of arrows 6—6 of FIG. 5;

FIG. 7 is a partial cross-sectional elevational view looking generally in the direction of arrows 7—7 of FIG. 5;

FIG. 8 is a side cross-sectional elevational view of a reciprocating mold transfer conveyor;

FIG. 9 is a partial top plan view looking generally in the direction of arrows 9—9 of FIG. 8;

FIG. 10 is a cross-sectional elevational view looking generally in the direction of arrows 10—10 of FIG. 9;

FIG. 11 is a partial top plan view showing an arrangement for positioning a weight on the top of successive molds;

DESCRIPTION OF PREFERRED EMBODIMENTS

Figure 1:
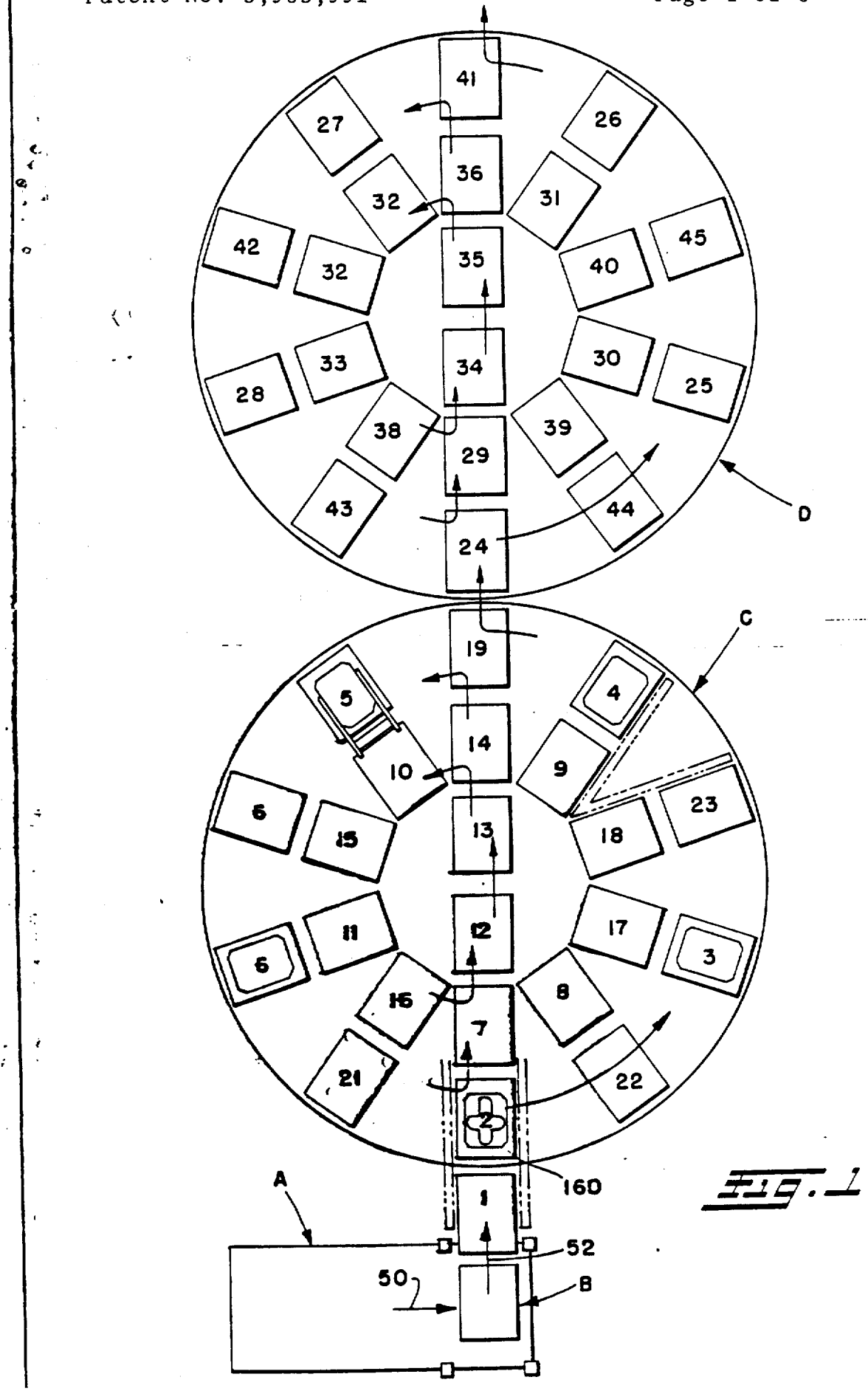
FIG. 1 is a plan view of a foundry mold conveying arrangement.

Referring now to the drawings, wherein the showings are for purposes of illustrating certain preferred embodiments of the invention only and not for purposes of limiting same, FIG. 1 shows conveyor A along which molds B are conveyed in the direction of arrow 50 from an automatic machine which manufactures foundry molds from sand. Successive molds B are then transferred from conveyor A in the direction of arrow 52 to a transfer station represented by the mold bearing numeral 1. The molds are successively transferred onto a rotatable conveyor which is generally identified by letter C. Molds are also transferred from rotatable conveyor C to an adjacent rotatable conveyor generally indicated by letter D.

Rotatable conveyor C has diametrically opposed loading and discharge stations identified by numerals 2 and 19. Rotatable conveyor D has diametrically opposed loading and discharge stations indicated by numerals 24 and 41. The positions of the molds on rotatable conveyors C and D are represented by numerals up to numeral 45. Mold 45 was the first one transferred onto conveyor C and each next declining numeral represents the next mold which was transferred from conveyor A onto conveyor C.

In the arrangement shown, there are inner and outer concentric rows of molds on each rotatable conveyor C and D, and each conveyor is rotatably indexed for aligning alternate molds with the loading and discharge stations. Subsequent to each indexing movement, molds are transferred between rows and discharged from the outer row. One indexing and transfer movement will be described, and the subsequent indexing and transfer movements will be readily apparent. With rotatable conveyors C and D positioned as shown, each is rotatably indexed counter-clockwise until numeral 23 is at the discharge station of conveyor C formerly occupied by numeral 19, and numeral 6 is at the loading station formerly occupied by numeral 2. Numeral 45 of conveyor D will be at the discharge station formerly occupied by numeral 41, and numeral 28 will be at the loading station formerly occupied by numeral 24. The molds are then shifted diametrically so that numeral 1 moves into the place of numeral 6; numeral 6 moves into the place of numeral 11; numeral 11 moves into the position of numeral 12; numeral 12 moves into the position of numeral 13; numeral 13 moves into the position of numeral 18; numeral 18 moves into the position of numeral 23; and numeral 23 moves into the position of numeral 28 on rotatable conveyor D. On rotatable conveyor D, numeral 28 moves into the position of numeral 33; numeral 33 moves into the position of numeral 34; numeral 34 moves into the position of numeral 35; numeral 35 moves into the position of numeral 40; numeral 40 moves into the position of numeral 45; and numeral 45 will be discharged from conveyor D. The rotatable conveyors will again be indexed counter-clockwise until numerals 22 and 5 occupy the discharge and loading stations on conveyor C, while numerals 44 and 27 will occupy the discharge and loading stations on conveyor D. With the arrangement described, each mold will have a maximum residence time on the conveyors for optimum cooling.

FIG. 2 represents an arrangement wherein rotatable conveyor E has upper and lower levels. The numerals surrounded by solid line rectangles are on an upper level, while the numerals surrounded by dotted line rectangles are on a lower level. In the arrangement shown, numeral 23 is being discharged from the lower level, while mold 1 is being transferred onto the upper level loading station diametrically opposed to the lower discharge station. The next counter-clockwise indexing movement of conveyor E will locate lower level numeral 22 in the place of numeral 18, while upper level numeral 6 will be in the place of numeral 2. Numeral 1 is then transferred onto the loading station to take the place of numeral 6; numeral 11 takes the place of numeral 12; a lowering device lowers numeral 12 to the lower level where it is shifted to take the place of numeral 17; numeral 17 takes the place of numeral 22; and numeral 22 is discharged from rotatable conveyor E. In the next indexing movement of conveyor E, numeral 21 will occupy the discharge station, while numeral 5 will occupy the loading station. Successive transfer between rows and levels takes place while molds are discharged from the lower level.

FIG. 3 shows another arrangement wherein rotatable conveyor F is fed with molds from a storage conveyor A, while alternate molds are fed directly from an automatic mold manufacturing machine. Such an arrangement makes it possible to use two or more automatic mold making machines, or to continue making molds with one machine while the pouring and cooling conveyor is shut down, and rotatable conveyor F has a capacity which is capable of pouring and cooling molds at a much faster rate than one automatic mold making machine is capable of producing molds. Transferring movement of molds on rotatable conveyor F is generally the same as that described with respect to FIG. 1. Mold 25 represents the first mold that was positioned on conveyor F and each next declining number represents the next mold which was positioned thereon. Rotatable conveyor F is rotated clockwise to align alternate molds with the discharge and loading stations. An indexing movement of conveyor F from the position shown will cause numeral 24 to be in the position of numeral 20 and numeral 6 to be in the position of numeral 2. With such an arrangement, each mold has a maximum residence time on conveyor F and the molds are discharged therefrom in the same order that they were received thereon.

Figure 4:
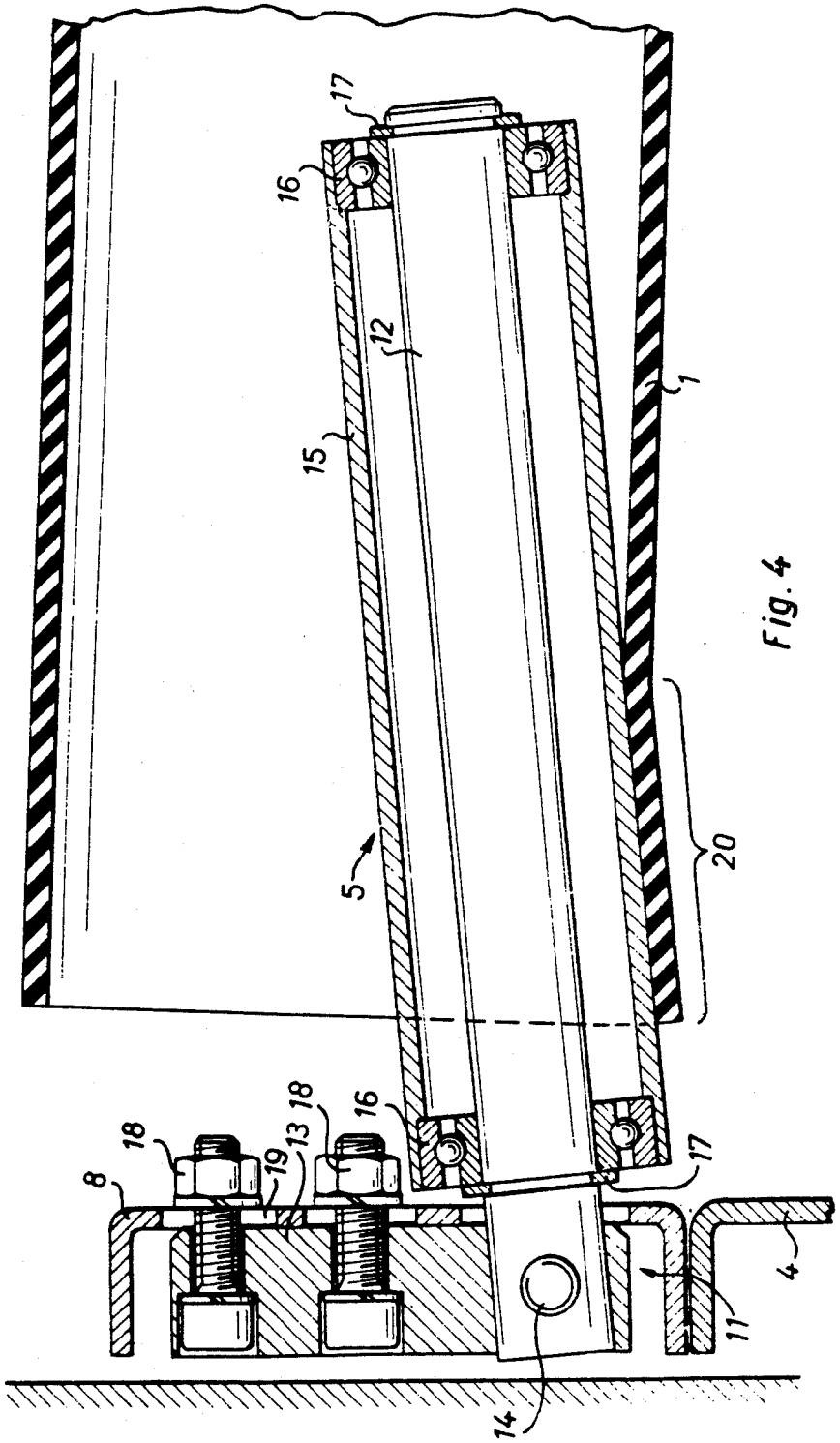
FIG. 4 is a plan view of another foundry mold conveying arrangement.

FIG. 4 shows another rotatable conveyor which simply has a larger number of stations. The arrangement shown is capable of handling forty molds. Numerals 1 through 42 represent molds and show the positions they occupy as they are loaded onto the conveyor; diametrically shifted between rows; and discharged from the outer row.

In all of the arrangements, it is obvious that each mold makes a complete revolution in the outer row and is then transferred to the inner row. Each mold then makes another complete revolution in the inner row and is transferred diametrically across the inner row where it again makes another complete revolution in the inner row. That mold is then transferred from the inner row to the outer row where it again makes another complete revolution with the conveyor before being discharged therefrom.

The movement of one mold will be described with respect to conveyor C of FIG. 1. Mold 2 will be successively indexed from the position shown to occupy the positions of numerals 3, 4, 5, 6, and end up back at 2. It will then be displaced by mold 1 to occupy the position of numeral 7. During succeeding indexing movements, the mold represented by numeral 2 will move to the positions of numerals 8, 9, 10, 11, and end up back at the position of numeral 7. Mold 2 will then be transferred diametrically between indexing movements of conveyor C to occupy the positions of numerals 12, 13 and 14. Mold 2 will then successively occupy the positions of numerals 15, 16, 17, 18, and end up back at 14. Mold 2 will then be moved from the position of numeral 14 out to the position of numeral 19 and will successively occupy the positions of numerals 20, 21, 22, 23, and end up back at 19 where it will be transferred from rotatable member C. Thus, it will be seen that each mold makes one complete revolution in the outer row before being transferred to the inner row; makes one complete revolution in the inner row before being transferred diametrically thereacross to make another complete revolution in the inner row; and is then transferred to the outer row to make another complete revolution. Each mold makes two revolutions in both the inner and outer rows and this is true of all embodiments. In the arrangement of FIG. 2 having upper and lower levels, each mold makes one complete revolution on both the inner and outer rows of the upper level, and a complete revolution in both the inner and outer rows on the lower level.

FIGS. 5 and 6 show a supporting frame G having a central post 60 on which a drive plate 62 is rotatably mounted. A rotatable support 64 has a bottom circumferential rail 66 riding on rollers 68 secured to frame G.

Rotatable support 64 has a plurality of circumferentially-spaced arms 70 secured thereto and extending generally radially outward from post 60. Arms 70 extend downwardly and have spaced-apart substantially horizontal extensions 72 secured thereto. Each extension 72 has four spaced-apart inwardly extending brackets 76 secured thereto which provide four-point support for a mold B. Each pair of extensions 72 support a pair of molds B therebetween in radially spaced relationship to one another.

Obviously, any suitable indexing drive device may be provided for rotatably indexing rotatable support 64 and a Geneva-type of mechanism may be provided if so desired. Drive plate 62 has a radially extending groove 80 in the upper surface thereof receiving a roller 82 secured to an arm 84 pivoted about pin 86 attached to fixed support 88 secured to post 60. A hydraulic or pneumatic cylinder 90 is pivotally mounted to support 88 as shown at 92 in FIG. 5. The rod end of cylinder 90 is pivotally connected to pivot arm 84 as by pin 94. A hydraulic or pneumatic cylinder 102 has a pin 104 in its rod end receivable in a socket 106 on rotatable support 64.

To rotatably index rotatable support 64, cylinder 102 is energized so that pin 104 is received in a socket 106. Cylinder 90 is then energized for pivoting pivot arm 84 to cause roller 82 to act along groove 80 for rotatably driving drive plate 62. Obviously, the indexing drive is adjustable so that a proper indexing movement will shift alternate pairs of extensions 72 in alignment with the loading and discharge stations. Subsequent to an indexing movement, cylinder 102 is operated for withdrawing pin 104 from socket 106. A locking cylinder 112 is also provided as shown in FIG. 7 mounted on fixed support 88 and including a pin 114 on its rod end receivable in a socket 116 in rotatable support 64. Subsequent to each indexing movement, cylinder 112 is energized so that pin 114 is received in socket 116 for holding rotatable support 64 against rotation while transfer of molds takes place. Cylinder 112 is energized to withdraw pin 114 from socket 116 prior to the next indexing movement. Withdrawal of pin 104 from socket 106 allows cylinder 90 to be retracted for rotating drive plate 62 back to its initial position preparatory to a next indexing movement. A plurality of circumferentially-spaced sockets 106 and 116 are provided on rotatable support 64 so that proper indexing and locking action are provided.

It is obvious that many different types of transfer mechanisms may be provided for transferring molds diametrically of the rotatable support and one such transfer mechanism is shown in FIGS. 8–10. Support G has pairs of roller assemblies 122 mounted thereon and a pair of spaced-apart elongated rails 124 are supported by roller assemblies 122 for longitudinal reciprocating movement. Rails 124 are secured to the opposite outer surfaces of an elongated support having a generally U-shape cross-sectional configuration as shown at 126 in FIG. 10. An elongated beam 128 is freely positioned within U-shaped support member 126 as shown in FIG. 10. Bell cranks 132 are pivotally connected to U-shaped support 126 as at 134 and to beam 128 as at 136. A double-acting hydraulic or pneumatic cylinder 138 in FIG. 8 is pivotally connected with bell cranks 132 as at 140. Beam 128 has mold engaging members 142 extending upwardly therefrom and such members are transversely spaced-apart a distance less than the distance between the facing inner edges of mold support brackets 76 on extensions 72 in FIG. 5. Mold engaging extensions 142 may be arranged in fours so that two extensions engage on each side of a mold B.

A double-acting hydraulic cylinder 146 is mounted on a suitable support 148 and connected as at 150 with U-shaped support member 126. Subsequent to a rotatable indexing movement of rotatable support 64, cylinder 138 is energized for raising beam 128 so that extensions 142 engage the molds and lift them from brackets 76. Cylinder 146 is then energized for reciprocating U-shaped support 126 and rails 124 relative to roller assemblies 122. The reciprocating movement is sufficient so that each mold will be shifted to a new position formerly occupied by the mold which was in front of it.

In the retracted position of the reciprocating transfer mechanism, it is located for lifting mold 1 in FIG. 1, as well as mold 19. Therefore, the reciprocating mechanism is capable of lifting and transferring one more mold than is diametrically positioned across the rotatable conveyor. Once the molds are lifted, the reciprocating mechanism is moved forwardly so that each mold occupies a new position, and cylinder 138 is then energized for lowering beam 128 and placing the molds back on extensions 76. The molds which occupy the center of the rotatable conveyor, as at 12, 13 and 14, are lowered onto fixed support ears 151 mounted on frame members 153 secured to support G. The transverse spacing of ears 151 is greater than the transverse spacing between extensions 142 so that ears 151 do not interfere with reciprocating movement of the transfer mechanism. The forward reciprocating movement of the reciprocating mechanism also transfers a mold from the rotatable conveyor onto a transfer table as shown at H in FIGS. 8 and 9. The molds are commonly supported on a rectangular bottom board as generally indicated at 154 in FIG. 8. It is possible to arrange the final mold engaging extensions 142 in such a manner that transfer of a mold from the reciprocating mechanism onto transfer table H will cause the bottom boards 154 to be disengaged from the mold and fall away therefrom. Once the molds are lowered after a shifting movement, cylinder 146 is energized for retracting the reciprocating mechanism so it is ready for another transfer operation. By way of example, the transfer mechanism of FIGS. 8 and 9 is one adapted for use with rotatable conveyor F of FIG. 3 which has three diametric center positions. FIG. 8 shows the transfer mechanism in a lowered and retracted position subsequent to transfer of mold 2 onto conveyor F and discharge of mold 25 therefrom. Conveyor F is then rotatably indexed so that molds 1, 6, 11, 12, 13, 14, 19 and 24 are diametrically aligned. Cylinder 138 is energized for swinging bell cranks 132 to raise beam 128 so that these molds are elevated on extensions 142. Cylinder 146 is then energized to shift support 126 to the right in FIG. 8. This will move mold 1 onto conveyor F and discharge mold 24 therefrom. The transfer mechanism is then lowered so that molds 11, 12 and 13 will rest on support ears 151, while molds 1 and 19 are in the outer row on conveyor F, and molds 6 and 14 in the inner row. The reciprocating transfer mechanism is then retracted and conveyor F again rotatably indexed. This procedure is successively repeated for transferring molds on and off the rotatable conveyor, and between rows thereon.

Figure 12:
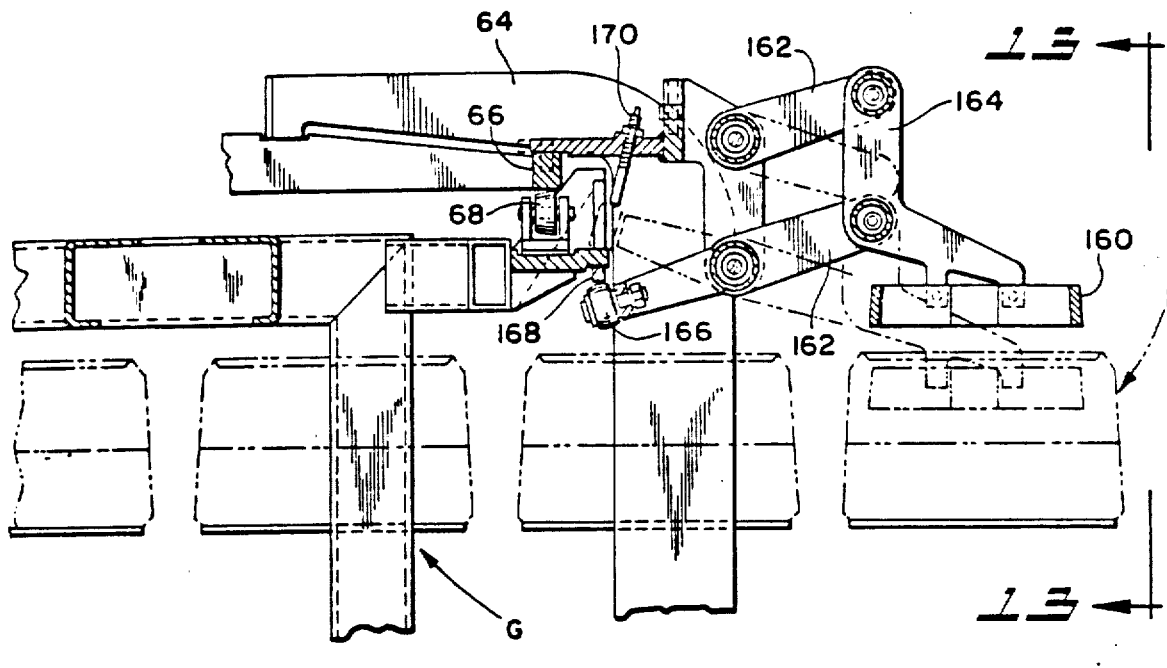
FIG. 12 is a partial cross-sectional elevational view looking generally in the direction of arrows 12—12 of FIG. 11.
Figure 13:
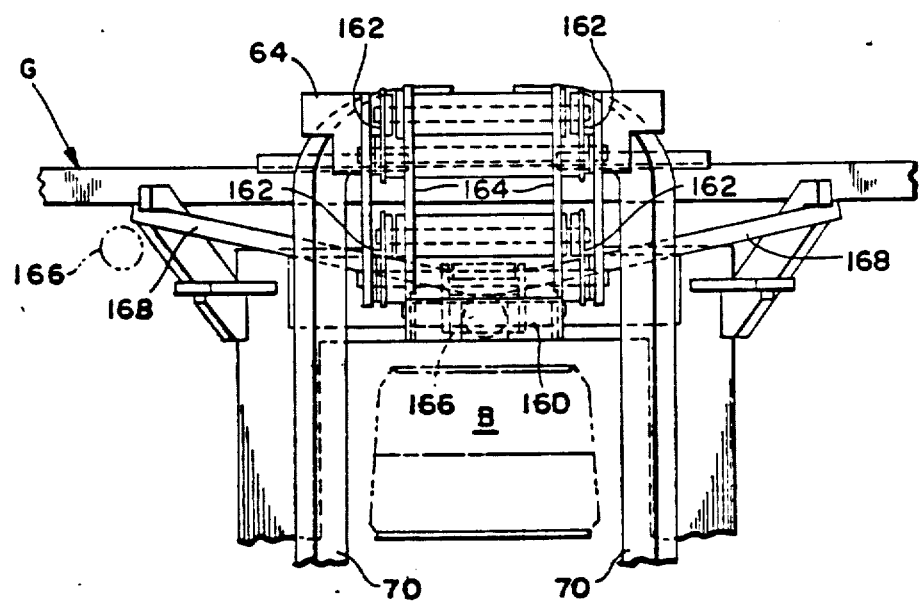
FIG. 13 is an end elevation view looking generally in the direction of arrows 13—13 of FIG. 12.

Rotatable support 64 is provided with a plurality of circumferentially-spaced weights as shown at 160 in FIG. 12 for positioning on top of each mold B as it is transferred into the outer row on the rotatable conveyor. Weight 160 is provided with suitable openings matching the gates and risers formed in the mold. It will be recognized that a weight 160 is mounted on rotatable support 64 between each alternate pair of extensions 72. Weight 160 is connected with parallel links 162 pivotally connected to arm 164 and rotatable support 64. The lowermost link has an extension portion on which a roller 166 is mounted. Frame G is provided with a cam generally indicated at 168 in FIG. 12 for cooperation with rollers 166. Cam 168 is located adjacent the discharge station and an adjustable stop 170 is secured to rotatable support 64 for limiting the movement of roller 166 to accurately position weight 160 on top of a mold. During rotation of rotatable support 64, weight 160 and the parallel link mechanism is normally in the shadow line position shown in FIG. 12. As a poured mold approaches the loading station where it will be transferred to the inner row, roller 166 strikes against cam 168 to move weight 160 and the parallel link mechanism to the solid line position shown. With the weight raised, the poured and partially cooled mold is transferred to the inner row, while an empty mold is transferred onto the loading station of the rotatable support. During the next indexing movement of the rotatable support, roller 166 falls away from cam 168 to the shadow line position shown so that weight 160 is in position on top of the mold and the mold is ready for pouring. Weights as at 160 and their operating mechanism can be provided only at alternate radial stations because the rotatable conveyor is indexed to align alternate molds with the loading and discharge stations. There are an even number of mold supports in both the inner and outer rows on the rotatable conveyor, and rotatable indexing to alternate mold supports is such that support positions with weights line up only at the loading station and not at the discharge station so that cam operation can take place to raise and lower the weights only as the loading station is approached and left.

In the arrangement of FIG. 2, there would be two reciprocating mechanisms, one for each level. Each reciprocating mechanism would extend diametrically across only approximately one-half of rotatable support E. The final mold engaging extensions on the top reciprocating member would be supported by a hydraulic cylinder or elevator so that the final mold engaging extension could be lowered a substantial distance for lowering a mold from the upper level onto the reciprocating mechanism on the lower level.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A foundry mold conveyor comprising; a rotatable mold supporting member for supporting molds thereabout, and a reciprocating mold transferring member extending generally diametrically across but not rotatable with said rotatable member for transferring molds from one side of said rotatable mold supporting member to the other, said rotatable mold support member supporting at least two concentric rows of molds including an inner row and an outer row, said reciprocating mold transferring member also discharging molds from said outer row.

2. The conveyor of claim 1 wherein said reciprocating mold transferring member is selectively raisable and lowerable for raising molds relative to said rotatable member during mold transfer and lowering the molds back onto said rotatable member subsequent to mold transfer.

3. A foundry mold conveyor comprising; a rotatable mold supporting member for supporting molds thereabout, and a reciprocating mold transferring member extending generally diametrically across but not rotatable with said rotatable member for transferring molds from one side of said rotatable mold supporting member to the other, said mold transferring member maintaining such molds in spaced-apart relationship to one another during transferring movement thereof.

4. The conveyor of claim 3 wherein said reciprocating mold transferring member is selectively raisable and lowerable for raising molds relative to said rotatable member during mold transfer and lowering the molds back onto said rotatable member subsequent to mold transfer.

5. The conveyor of claim 3 wherein said rotatable member has diametrically opposed mold loading and discharge stations.

6. The conveyor of claim 3 wherein said reciprocating member is raisable and lowerable for lifting molds from said rotatable member during transfer thereof.

7. A foundry mold conveyor comprising a rotatable mold supporting member and a reciprocating mold transferring member extending generally diametrically across said rotatable member for transferring molds from one side of said rotatable mold supporting member to the other, said rotatable member supporting concentric rows of molds, and indexing means for rotatably indexing said rotatable member to align every other mold with said reciprocating member subsequent to each mold transfer movement of said reciprocating member.

8. The conveyor of claim 7 and including releasable locking means for locking said rotatable member in its indexed position.

9. A method of transferring foundry molds comprising the steps of; positioning molds in concentric rows on a rotatable member having diametrically opposite loading and discharge stations, and rotatably indexing said rotatable member to successively align molds with said stations, and transferring molds between said rows and discharging molds from the outer one of said rows at said discharge station between each indexing movement of said rotatable member, said rotatable member being rotatably indexed and said mold being diametrically transferred so that each mold makes two revolutions with said rotatable member in each of said rows.

10. The method of claim 9 and further including the step of transferring said molds onto another rotatable member.

11. The method of claim 9 and including the step of lifting said molds from said rotatable member during transferring movement thereof.

12. The method of claim 9 wherein said step of transferring molds between said rows is carried out by maintaining said molds in spaced-apart relationship to one another.

13. A foundry mold conveyor comprising; a rotatable mold supporting member and a reciprocating mold transferring member extending generally diametrically across said rotatable member for transferring molds thereacross, said rotatable member having a fixed support and including a transfer station for transferring molds onto said rotatable member, movable weight means carried by said rotatable member for positioning on top of molds transferred onto said rotatable member, cooperating cam and cam follower means on said fixed support and rotatable member for automatically raising said weight means as it reaches said transfer station and for lowering said weight means into engagement with a mold as it moves away from said transfer station.

14. A foundry mold conveyor comprising; a rotatable mold supporting member and a reciprocating mold transferring member extending generally diametrically across said rotatable member for transferring molds thereacross, said rotatable member supporting inner and outer concentric rows of molds, and indexing means for rotatably indexing said rotatable member, said indexing means and said reciprocating mold transferring member being operative for transferring molds so that each mold makes two complete revolutions with said rotatable member in each of said rows.

15. A foundry mold conveyor comprising; a rotatable member for supporting at least two concentric rows of molds including inner and outer rows, transfer means extending diametrically of said rotatable member for transferring molds between said rows and discharging molds from said outer row, said rotatable member having diametrically opposed mold loading and discharge stations, said transfer means comprising a reciprocating member which is raisable and lowerable for lifting molds from said rotatable member during transfer thereof, and indexing means for rotatably indexing said rotatable member in successive steps for aligning every other mold in said rows with said loading and discharge stations.

16. A foundry mold conveyor comprising; a rotatable member for supporting at least two concentric rows of molds including inner and outer rows, transfer means extending diametrically of said rotatable member for transferring molds between said rows and discharging molds from said outer row, said rotatable member having diametrically opposed mold loading and discharge stations, and indexing means for rotatably indexing said rotatable member in successive steps for aligning every other mold in said rows with said loading and discharge stations.

17. A method of transferring foundry molds comprising the steps of; positioning molds in concentric rows on a rotatable member having diametrically opposite loading and discharge stations, and rotatably indexing said rotatable member to successively align molds with said stations, and transferring molds diametrically of said rotatable member between said rows and discharging molds from the outer one of said rows at said discharge station between each indexing movement of said rotatable member, said indexing step being carried out by rotatably indexing said rotatable member to align every other mold with said stations.

18. A foundry mold conveyor comprising; a rotatable mold supporting member for supporting molds thereabout, and a reciprocating mold transferring member extending generally diametrically across but not rotatable with said rotatable member for transferring molds from one side of said rotatable mold supporting member to the other, there being at least two of said rotatable mold supporting members positioned adjacent one another, said reciprocating mold transferring member on one of said rotatable members also transferring molds from said one rotatable member to the other of said rotatable members.

19. A foundry mold conveyor comprising; a rotatable mold supporting member for supporting molds thereabout, a reciprocating mold transferring member extending generally diametrically across but not rotatable with said rotatable member for transferring molds from one side of said rotatable mold supporting member to the other, said rotatable member supporting molds on two different levels, and transfer means for transferring molds from one level to the other.

* * * * *

UNITED STATES PATENT OFFICE
CERTIFICATE OF CORRECTION

Patent No. 3,983,991      Dated October 5, 1976

Inventor(s) Robert G. Shields      Page 1 of 8

It is certified that error appears in the above-identified patent and that said Letters Patent are hereby corrected as shown below:

The drawing figures of Patent No. 3,983,991 pertain to another patent, substitute the correct drawings as shown on the attached sheets.

Signed and Sealed this

Twenty-fifth Day of January 1977

[SEAL]

Attest:

RUTH C. MASON
*Attesting Officer*

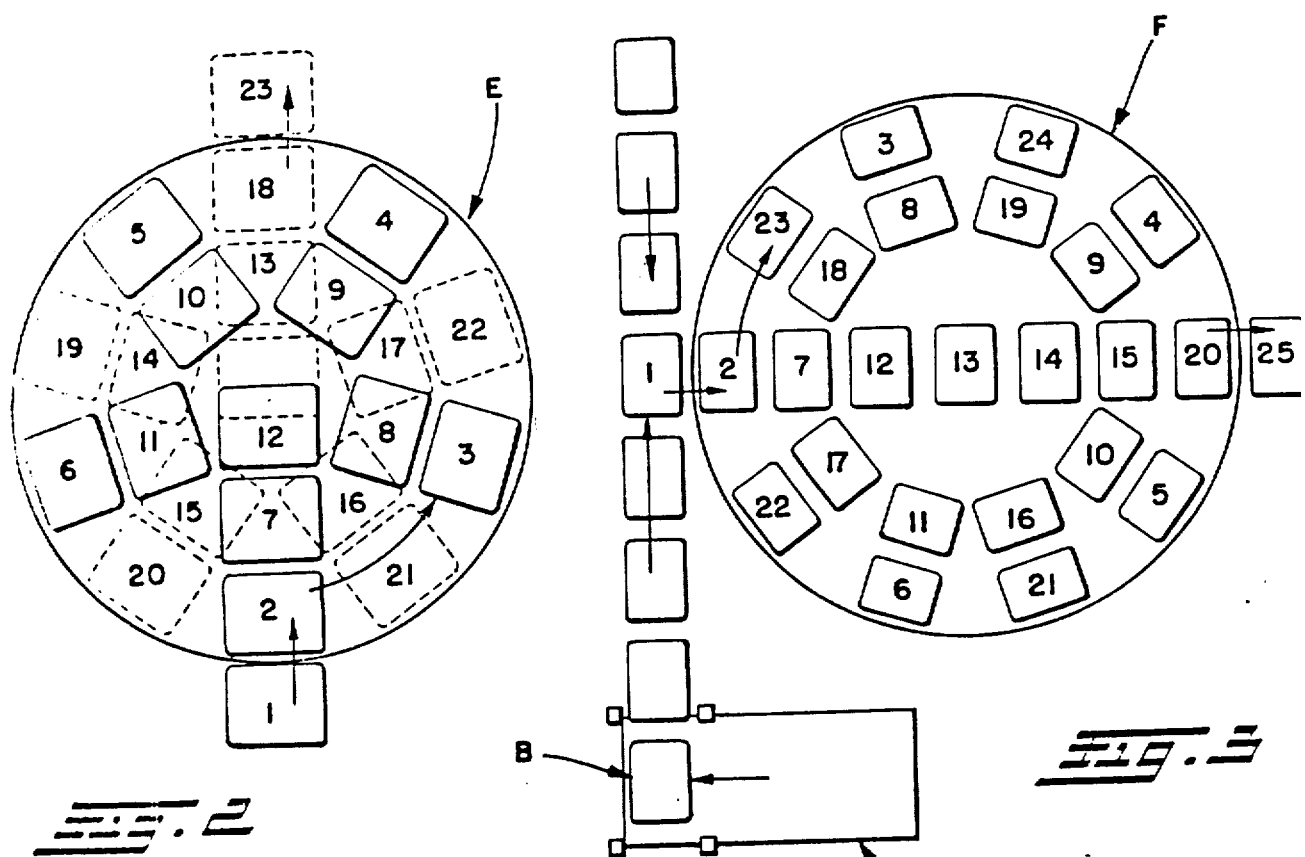
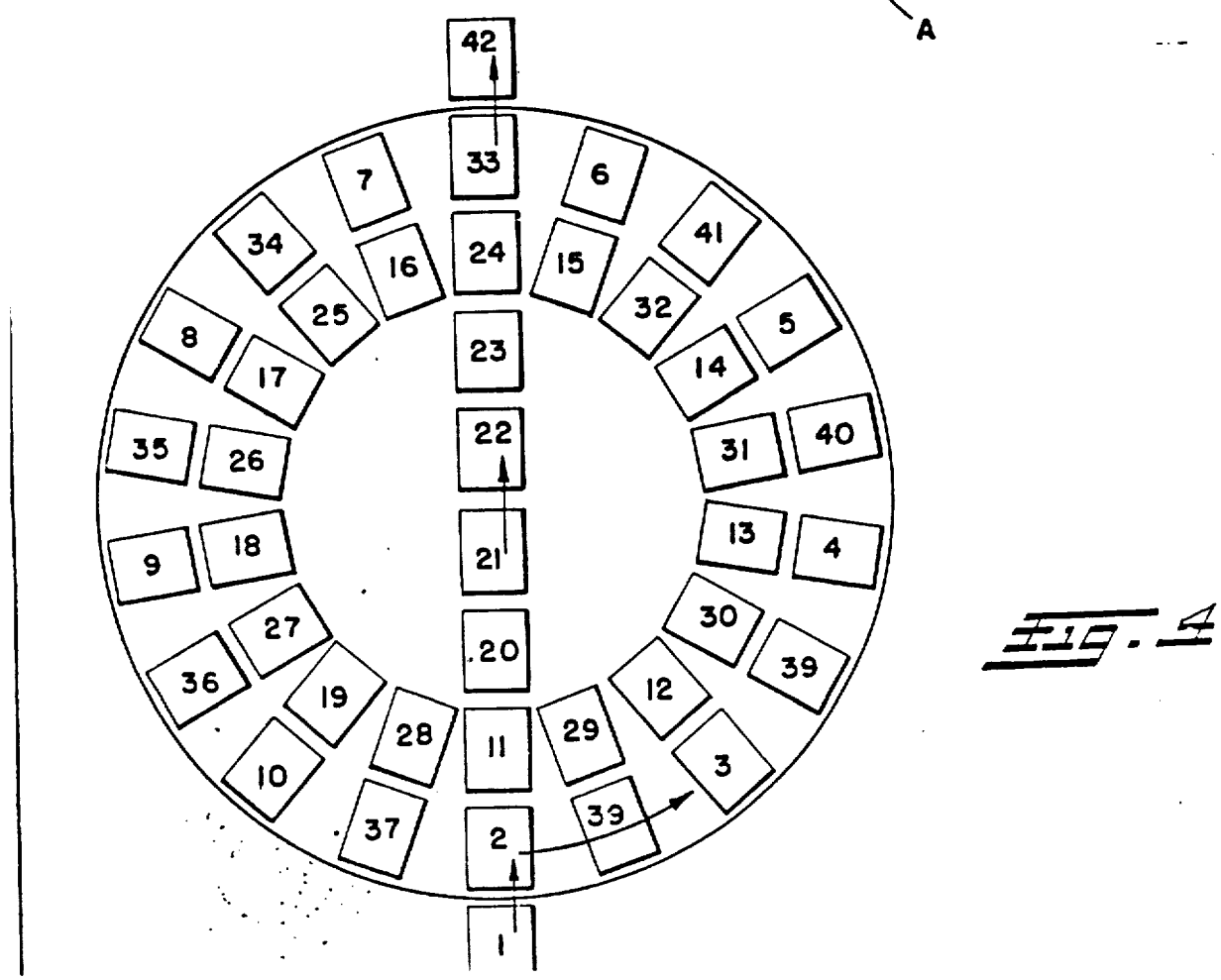

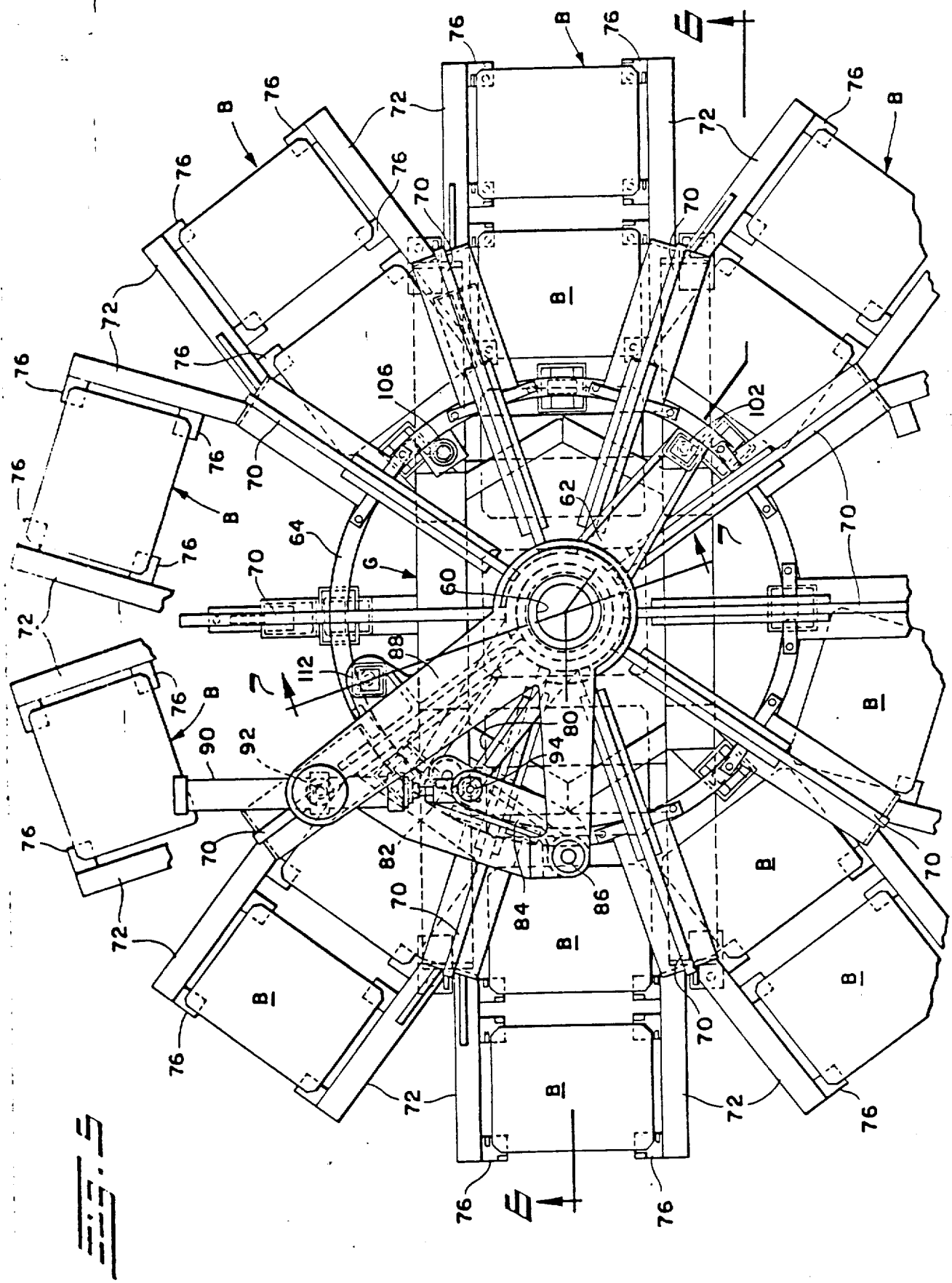

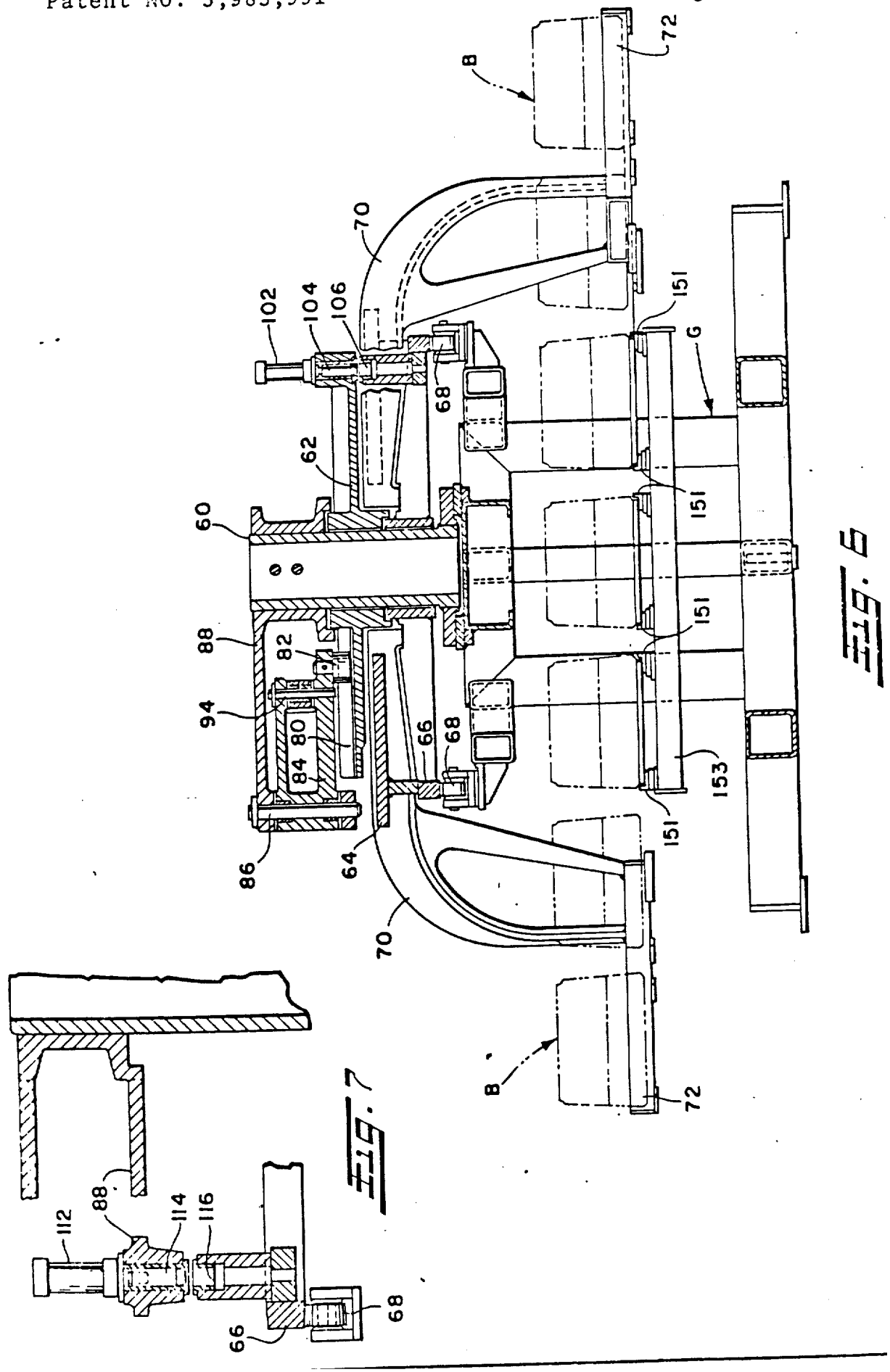

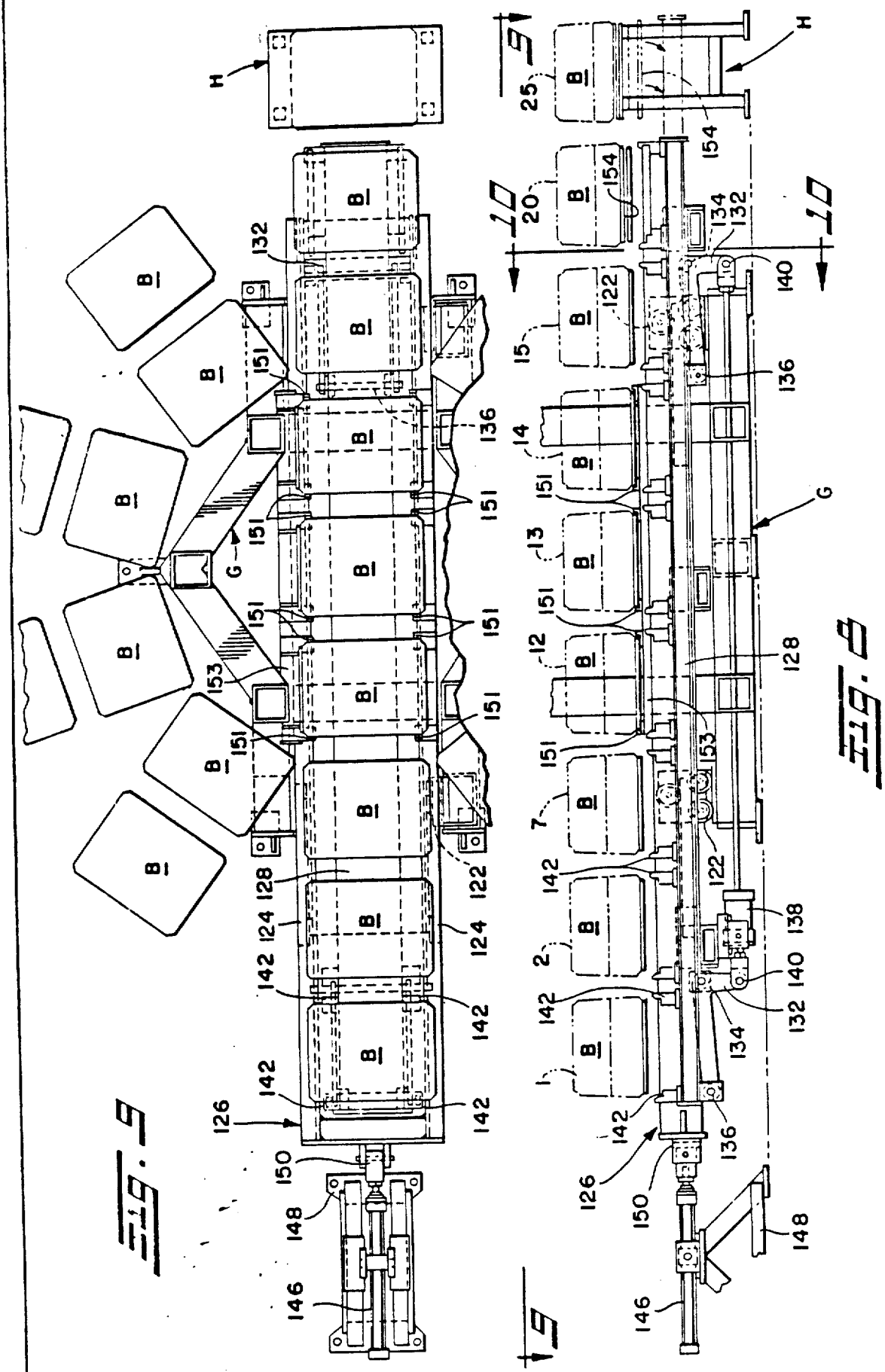

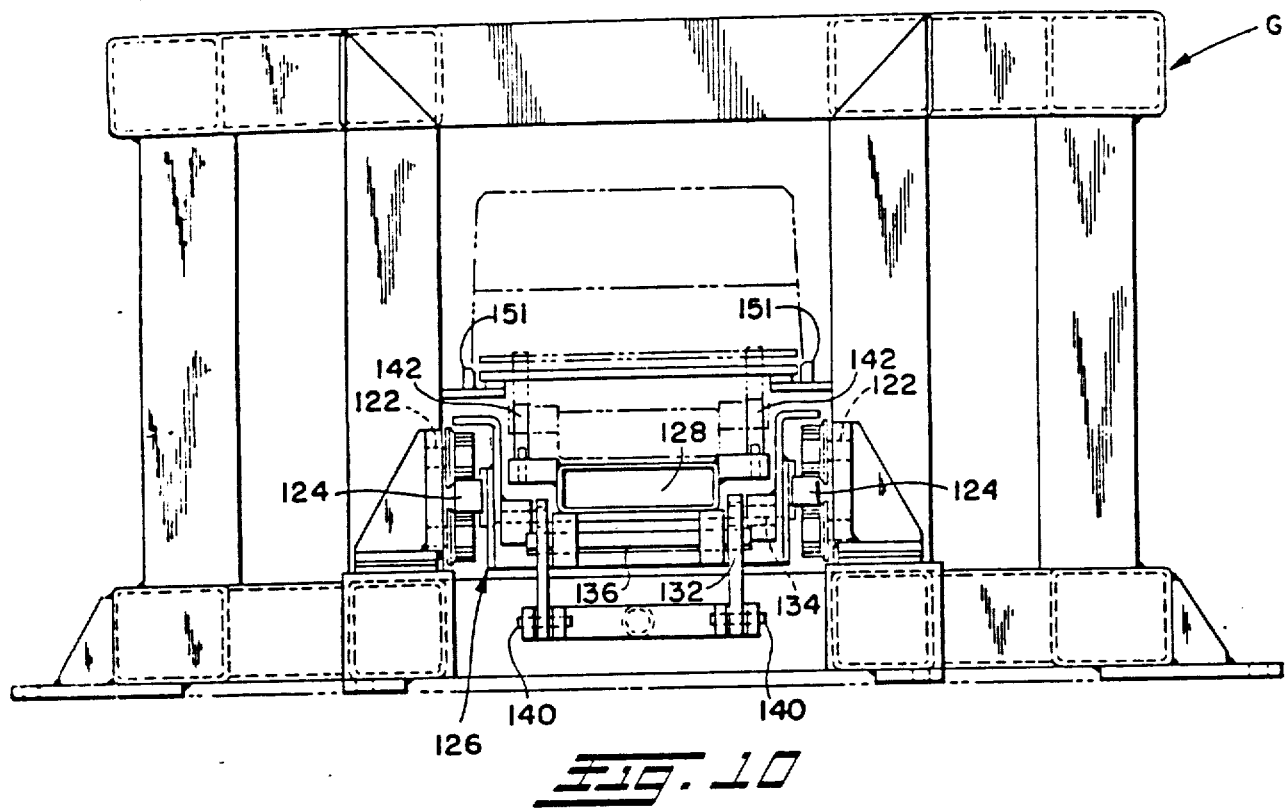

C. MARSHALL DANN
*Commissioner of Patents and Trademarks*